Patented July 31, 1923.

1,463,539

UNITED STATES PATENT OFFICE.

CHARLES G. WOLFE, OF MOUNT VERNON, OHIO.

PHARMACEUTICAL PREPARATION.

No Drawing. Application filed March 8, 1922. Serial No. 542,111.

*To all whom it may concern:*

Be it known that I, CHARLES G. WOLFE, residing at Mount Vernon, in the county of Knox and State of Ohio, have invented certain Improvements in Pharmaceutical Preparations, of which the following is a specification.

This invention relates to pharmaceutical preparations, and more particularly to remedies for certain common diseases prevalent among fowls.

My invention is applicable to a disease commonly met with among domestic fowls of the species known as turkeys, the disease in question being commonly called "black head." This complaint is due to a diseased condition of the liver of the turkey, the liver becoming enlarged and covered with yellow spots. So far as can be determined, the disease is due to the character of the food eaten by the fowl and is probably caused by a smut which sometimes occurs upon grain, such as wheat and corn. The head of a turkey afflicted in the manner above described turns black; hence the term "black head".

This disease is a very serious financial menace to persons engaged in raising turkeys, as it is almost invariably fatal, and heretofore no adequate remedy for coping with this disease has been obtainable. I have discovered, however, as a result of a series of experiments, that this disease may be cured by the internal application of a preparation consisting of mild mercurous chloride or calomel, as it is commonly called, and rhei radix, commonly known as rhubarb, together with a small amount of carbo ligni or common charcoal. Preferably, these ingredients should be mixed in powdered form in the proportions by weight of 50 per cent calomel, 45 per cent rhubarb and 5 per cent charcoal.

The powder thus obtained may be administered to a fowl suffering from the complaint above referred to by stirring the powder in milk. I have found the preparation applied in the manner stated to be very efficacious, a complete cure being effected in a very large percentage of the cases tested.

While, as above stated, a preparation having ingredients in the proportions indicated has been found to produce the best results, the remedy is effective even though the proportions are varied within limits, and it is, therefore, within the scope of my invention to use the remedy with proportions departing to some extent from those above given.

Having now described my invention, what I claim as new and desire to secure by Letters-Patent is as follows:

1. A pharmaceutical preparation for treating the disease of fowls known as enterohepatitis consisting of calomel and rhubarb in approximately equal proportions, together with a small percentage of charcoal.

2. A pharmaceutical preparation for treating the disease of fowls known as enterohepatitis consisting of about 50 per cent calomel, 45 per cent rhubarb and 5 per cent charcoal.

3. A pharmaceutical preparation for treating the disease of fowls known as enterohepatitis consisting of about 50 per cent calomel, 45 per cent rhubarb and 5 per cent charcoal, thoroughly mixed in powdered form.

4. A pharmaceutical preparation for treating the disease of fowls known as enterohepatitis consisting of approximately equal proportions of powdered calomel and rhubarb mixed with powdered charcoal, in the proportion of about one part of charcoal to ten parts of each of the other two ingredients.

In testimony whereof, I have signed my name to this specification this 4th day of March, 1922.

CHARLES G. WOLFE.